United States Patent
Ferreri et al.

(10) Patent No.: US 10,638,018 B2
(45) Date of Patent: Apr. 28, 2020

(54) MECHANISM TO PERFORM FORCE COLOR PARAMETER TRANSFORMATIONS

(71) Applicants: Vincent Ferreri, Frederick, CO (US); Walter F. Kailey, Frederick, CO (US); Larry M. Ernst, Longmont, CO (US)

(72) Inventors: Vincent Ferreri, Frederick, CO (US); Walter F. Kailey, Frederick, CO (US); Larry M. Ernst, Longmont, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/697,817

(22) Filed: Sep. 7, 2017

(65) Prior Publication Data

US 2019/0075220 A1 Mar. 7, 2019

(51) Int. Cl.
*H04N 1/60* (2006.01)
*H04N 1/64* (2006.01)
*H04N 1/405* (2006.01)

(52) U.S. Cl.
CPC .......... *H04N 1/60* (2013.01); *H04N 1/6019* (2013.01); *H04N 1/6025* (2013.01); *H04N 1/6027* (2013.01); *H04N 1/405* (2013.01); *H04N 1/6058* (2013.01); *H04N 1/64* (2013.01); *H04N 1/646* (2013.01); *H04N 1/648* (2013.01)

(58) Field of Classification Search
CPC combination set(s) only.
See application file for complete search history.

(56) References Cited

U.S. PATENT DOCUMENTS

| | | | |
|---|---|---|---|
| 4,887,150 A | 12/1989 | Chiba et al. | |
| 6,343,145 B1 | 1/2002 | Schuneman et al. | |
| 6,459,437 B1 | 10/2002 | Sekino et al. | |
| 6,559,975 B1 * | 5/2003 | Tolmer | H04N 1/56 358/1.9 |
| 6,873,434 B1 | 3/2005 | Kohler et al. | |
| 7,046,393 B2 | 5/2006 | Zeng | |
| 7,259,893 B2 | 8/2007 | Falk et al. | |
| 7,307,753 B2 | 12/2007 | Sasaki et al. | |
| 7,821,689 B2 | 10/2010 | Rijavec | |
| 7,859,722 B1 | 12/2010 | Kulkarni | |
| 7,995,237 B2 | 8/2011 | Haikin et al. | |
| 8,131,070 B2 | 3/2012 | Sasaki | |
| 8,139,275 B2 | 3/2012 | Watanabe | |
| 8,253,979 B2 | 8/2012 | Wen et al. | |
| 8,582,188 B2 | 11/2013 | Sanchez et al. | |

(Continued)

FOREIGN PATENT DOCUMENTS

| | | |
|---|---|---|
| JP | 4010959 | 1/1992 |
| JP | 4346571 | 12/1992 |

(Continued)

OTHER PUBLICATIONS

Extended European Search Report for EP Application No. 18191485.4, 10 pages, dated Nov. 27, 2018.

*Primary Examiner* — Barbara D Reinier
(74) *Attorney, Agent, or Firm* — Jaffery Watson Mendonsa & Hamilton LLP (57) ABSTRACT

A printing system is disclosed. The printing system includes a color management unit including one or more color caches to store input colors and corresponding output colors and a color engine (CE) to receive the input colors and perform Force-X transformations to map an input color into an output color based on a pre-defined color parameter.

20 Claims, 7 Drawing Sheets

(56) References Cited

U.S. PATENT DOCUMENTS

| | | | |
|---|---|---|---|
| 8,587,828 | B2 | 11/2013 | Qiao et al. |
| 8,593,693 | B2 | 11/2013 | Qiao et al. |
| 8,605,329 | B2 | 12/2013 | Shestak et al. |
| 8,767,258 | B2 | 7/2014 | Shestak et al. |
| 9,258,455 | B2 | 2/2016 | Li et al. |
| 9,501,727 | B2 | 11/2016 | Morovic et al. |
| 9,742,959 | B1 | 8/2017 | Kailey |
| 10,009,514 | B2* | 6/2018 | Ferreri ................. H04N 1/6025 |
| 2003/0020935 | A1 | 1/2003 | Morimatsu |
| 2007/0206850 | A1* | 9/2007 | Lin ...................... H04N 1/6016 |
| | | | 382/162 |
| 2008/0025602 | A1 | 1/2008 | Won et al. |
| 2011/0149307 | A1 | 6/2011 | Tin |
| 2013/0016370 | A1* | 1/2013 | Shestak ............... H04N 1/6025 |
| | | | 358/1.9 |
| 2015/0161488 | A1 | 6/2015 | Okumura |
| 2018/0048787 | A1 | 2/2018 | Ferreri et al. |
| 2018/0176421 | A1* | 6/2018 | Ferreri ................. H04N 1/6025 |

FOREIGN PATENT DOCUMENTS

| | | |
|---|---|---|
| JP | 2004112313 A | 4/2004 |
| JP | 201228925 A | 8/2013 |
| JP | 2013163794 A | 8/2013 |
| JP | 8010902 | 4/2016 |

\* cited by examiner

```
LUT buildLut()
{
      ...

// Partition the input space into a 10x10x10 grid and build the Force-X
LUT
      for( r = 0; r < 256; r += 25.5 )
      {
            for( g = 0; g < 256; g += 25.5 )
            {
                  for( b = 0; b < 256; b += 25.5 )
                  {
                        inColor = [r,g,b];
                        outColor1 = // <Expression for RGB-to-CMYK>
                        outColor2 = [128,128,0,2];   // Forced color
                        x = sqrt( r^2 + (g - 255)^2 + (b - 100)^2 );   //
      Euclidean distance to (0,255,100)
                        LUT.addNode( inColor, outColor1, x, outColor2 )
                  }
            }
      } return LUT;
} color computeColor( cache, LUT, inColor, xThreshold )
{
      // Check if color is in cache
      if( cache.contains( inColor )
            return cache.getOutColor( inColor );

// Interpolate in the LUT and return the appropriate color
      [outColor1, x, outColor2] = LUT.interpolate( inColor );
      if( x < xThreshold )
            outColor = outColor1;
      else
            outColor = outColor2;

// Add the input/output colors to the cache for next time
      cache.add( inColor, outColor );
      // Return the computed color
      return outColor;
}
```

FIG. 6A

```
LUT buildColorSubLut()
{
    ...
    // Partition the input space into a 10x10x10 grid and build the Force-X
LUT
    for( r = 0; r < 256; r += 25.5 )
    {
        for( g = 0; g < 256; g += 25.5 )
        {
            for( b = 0; b < 256; b += 25.5 )
            {
                inColor = [r,g,b];
                outColor1 = // < Expression for RGB-to-CMYK >

[L,A,B] = rgb2lab( inColor );
                outColor2 = [0,0,0,L];  // Forced-K color
                x = sqrt( A^2 + B^2 );  // Chroma
                LUT.addNode( inColor, outColor1, x, outColor2 )
            }
        }
    } return LUT;
}
```

FIG. 6B

```
LUT buildLut()
{
    ...
    // Partition the input space into a 10x10x10 grid and build the Force-X
LUT
    for( r = 0; r < 256; r += 25.5 )
    {
        for( g = 0; g < 256; g += 25.5 )
        {
            for( b = 0; b < 256; b += 25.5 )
            {
                inColor = [r,g,b];
                outColor1 = // < Expression for RGB-to-CMYK >

[L,A,B] = rgb2lab( inColor );
                hue = atan2( A, B );
                chroma = sqrt( A^2 + B^2 );
                forcedA = chroma * sin( 354*deg );
                forcedB = chroma * cos( 354*deg );
                outColor2 = lab2cmyk( [L,forcedA,forcedB] );  //
    Forced color
                x = abs( 354 - hue );  // hue-angle difference
                LUT.addNode( inColor, outColor1, x, outColor2 )
            }
        }
    } return LUT;
}
```

MECHANISM TO PERFORM FORCE COLOR PARAMETER TRANSFORMATIONS

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates to the field of color management, and in particular, to mapping pure input colors via color management to true output colors.

BACKGROUND

In commercial and transactional printers it is common to apply a Force-Black (Force-K) transformation to colors in order to produce a more desirable color output and/or save ink/toner. This transformation essentially maps input colors that are near black into pure black (or gray scale) colors.

However, it may be desirable to perform Force-X transformations, where X is a generic color parameter. Such parameters may include, but are not limited to: Black (e.g., traditional Force-K); Primary (e.g., process colors, Cyan, Magenta, or Yellow); Secondary (e.g., Red, Green, or Blue); Hue-Angle (e.g. preserve the hue of Ricoh-Red); Euclidean Distance (e.g., exact color substitution); Rich-Black (e.g., Force-X but going to rich black); Lightness (e.g., limit darkness/lightness); Chroma (e.g., limit chroma for defining a maximum gamut); or any set of colors defined through a coordinate transformation.

Accordingly, a mechanism to perform Force-X transformations is desired.

SUMMARY

In one embodiment, a printing system is disclosed. The printing system includes a color management unit including one or more color caches to store input colors and corresponding output colors and a color engine (CE) to receive the input colors and perform Force-X transformations to map an input color into an output color based on a pre-defined color parameter.

In a further embodiment, a method is disclosed including receiving an input color and performing a Force-X transformation to map the input color into an output color based on a pre-defined color parameter.

BRIEF DESCRIPTION OF THE DRAWINGS

A better understanding of the present invention can be obtained from the following detailed description in conjunction with the following drawings, in which.

DETAILED DESCRIPTION

A mechanism to perform Force-X transformations is described. In the following description, for the purposes of explanation, numerous specific details are set forth to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
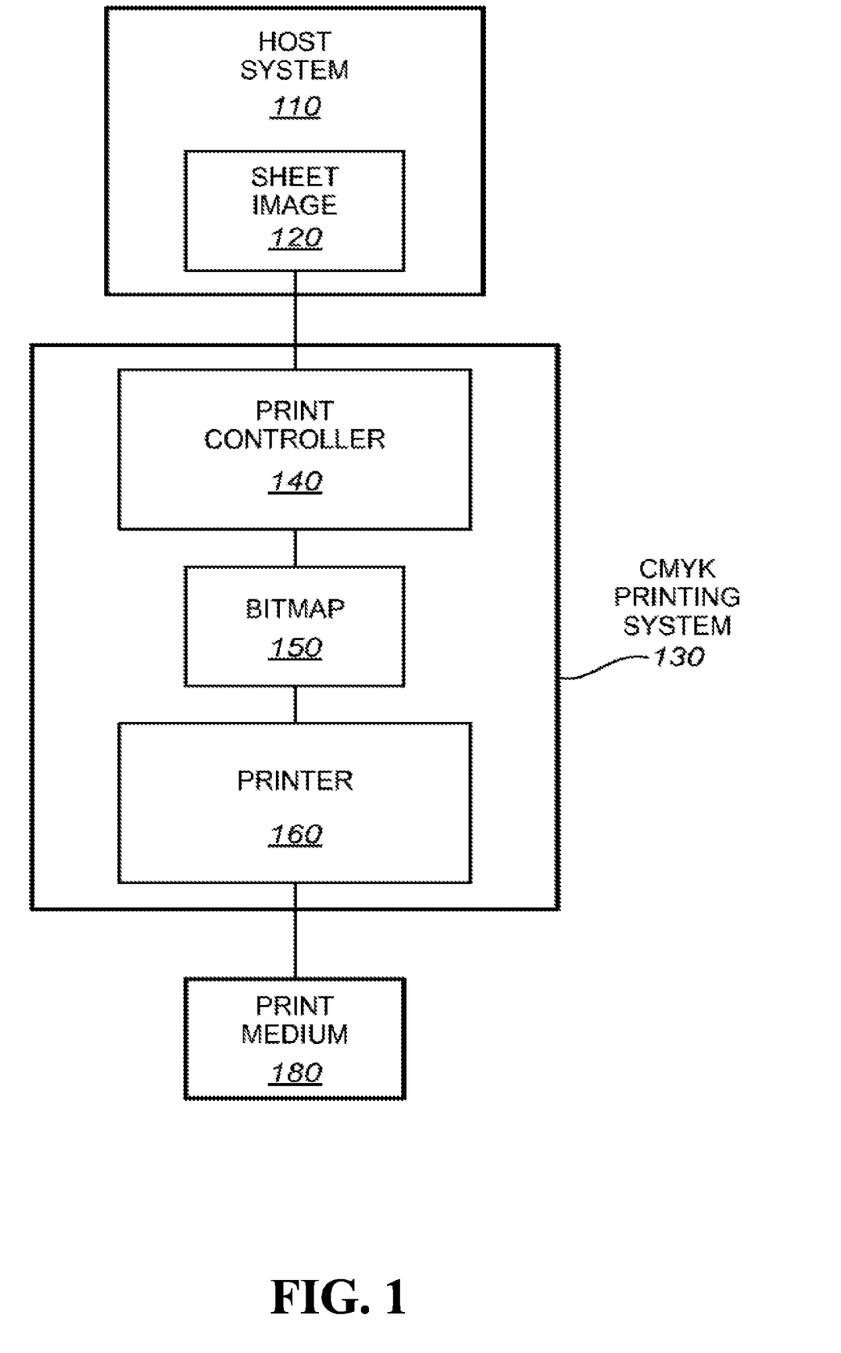
FIG. 1 is a block diagram of one embodiment of a printing system.

FIG. 1 is a block diagram illustrating one embodiment of a printing system 130. A host system 110 is in communication with the printing system 130 to print a sheet image 120 onto a print medium 180 (e.g., paper) via a printer 160. The resulting print medium 180 may be printed in color and/or in any of a number of gray shades, including black and white (e.g., Cyan, Magenta, Yellow, and blacK, (CMYK)). The host system 110 may include any computing device, such as a personal computer, a server, or even a digital imaging device, such as a digital camera or a scanner.

The sheet image 120 may be any file or data that describes how an image on a sheet of print medium 180 should be printed. For example, the sheet image 120 may include PostScript data, Printer Command Language (PCL) data, and/or any other printer language data. The print controller 140 processes the sheet image to generate a bitmap 150 that is to be transmitted for printing to the print medium 180 via the printer 160. The printing system 130 may be a high-speed printer operable to print relatively high volumes (e.g., greater than 100 pages per minute). The print medium 180 may be continuous form paper, cut sheet paper, and/or any other tangible medium suitable for printing. The printing system 130, in one generalized form, includes the printer 160 that presents the bitmap 150 onto the print medium 180 (e.g., via toner, ink, etc.) based on the sheet image 120.

The print controller 140 may be any system, device, software, circuitry and/or other suitable component operable to transform the sheet image 120 for generating the bitmap 150 in accordance with printing onto the print medium 180. In this regard, the print controller 140 may include processing and data storage capabilities.

Figure 2:
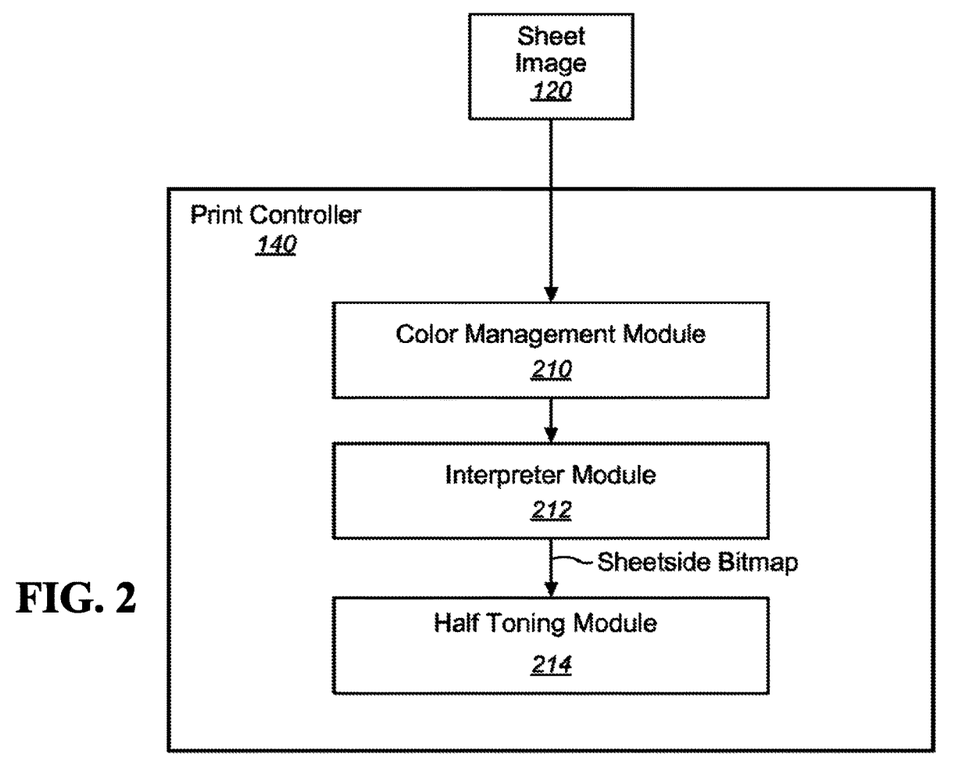
FIG. 2 is a block diagram of one embodiment of a print controller.

FIG. 2 is a block diagram illustrating one embodiment of a print controller 140. The print controller 140 (e.g., DFE or digital front end), in its generalized form, includes color management module 210, interpreter module 212 and halftoning module 214. Color management module 210 provides a color mapping from an input color space to a printer 160 color space.

Interpreter module 212 is operable to interpret, render, rasterize, or otherwise convert images (e.g., raw sheetside images or printer language data such as sheet image 120) of a print job into sheetside bitmaps. The sheetside bitmaps generated by interpreter module 212 are each a 2-dimensional array of pixels representing an image of the print job (e.g., a Continuous Tone Image (CTI)), also referred to as full sheetside bitmaps. The 2-dimensional pixel arrays are considered "full" sheetside bitmaps because the bitmaps include the entire set of pixels for the image. Interpreter module 212 is operable to interpret or render multiple raw sheetsides concurrently so that the rate of rendering substantially matches the rate of imaging of production print engines. Halftoning module 214 is operable to represent the sheetside bitmaps as halftone patterns of ink. For example, halftoning module 214 may convert the pixels to halftone patterns of CMYK ink for application to the paper.

Figure 3:
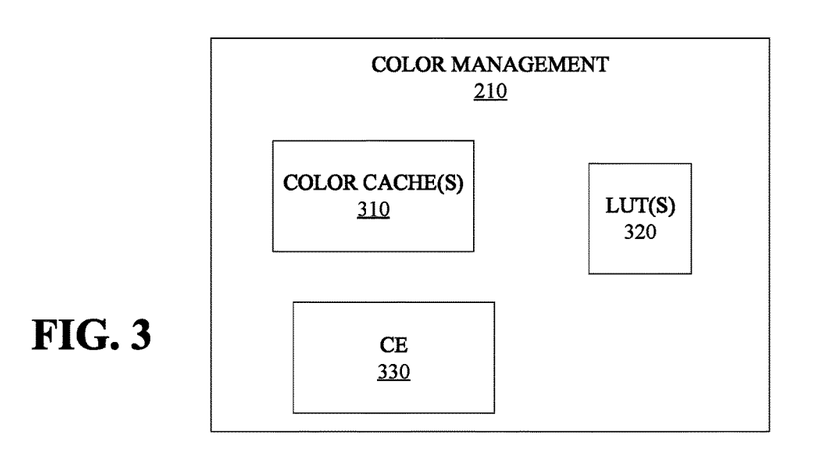
FIG. 3 illustrates one embodiment of a color management unit.

In one embodiment, color management unit 210 uses ICC profiles to perform a color managed workflow by mapping to determine CMYK values for each pixel in a particular object to be printed at printer 160. FIG. 3 is a block diagram illustrating one embodiment of a color management unit 210. Color management unit 210 includes one or more color caches 310, and one or more color lookup tables (LUTs) 320. Color cache(s) 310 may be hardware and/or software components that store color mapping data so that future requests for that data can be served faster.

In one embodiment, color management unit 210 includes a color engine (CE) 330 to perform a lookup of color cache 310 upon receiving an input color to determine if the input color is included in color cache 310 with a corresponding output color. If so, the output color is provided for the color management workflow. However, if there is no entry in color cache 310, LUT 320 is utilized to perform a multi-dimensional interpolation in order to generate the output color. Next, the input color and the resulting output color are stored as an entry in color cache 310 for later use.

Color management unit 210 also performs Force-X transformations to map an input color into an output color based on a general pre-defined color parameter ("X"). For instance, X may represent a Force-K parameter in which the input color is mapped into a pure black (or gray scale) color. However, in another embodiment the X may represent a primary color (e.g. Force-Primary (CMY)) in which the input color is mapped into a primary color.

In still other embodiments, X may represent a secondary parameter (e.g., Force-Secondary (Red, Green or Blue (RGB)), a Hue-Angle (to preserve a color hue, Euclidean Distance to perform an exact color substitution, Rich-Black to K, K to Rich Black, Lightness to limit darkness/lightness, Chroma to limit chroma for defining a maximum gamut, or any set of colors defined through a coordinate transformation.

According to one embodiment, management unit 210 dynamically identifies Force-X input colors in order to perform the transformation. In such an embodiment, color engine 330 enables two colors to be simultaneously interpolated in LUT 320. Thus, LUT 320 enables Force-X implementation by mapping an input color into two output colors and a generic forcing parameter such that LUT 320 performs:

InColor->{OutColor1, x, OutColor2}, where
  InColor=the input color to be color managed;
  OutColor1=the output color if X is not forced;
  x=a parameter (e.g., 0 to n) to compare to the forcing threshold when deciding if X is forced; and
  OutColor2=the output color if X is forced.

Based on the above, one interpolation gives {OutColor1, x, OutColor2} and the final color-managed output color is computed by:

if($x<x_{Threshold}$)->OutColor=OutColor1,
  else OutColor=OutColor2, where
    $x_{Threshold}$=current forcing threshold; and
    OutColor=final color-managed output color.

Figure 4:
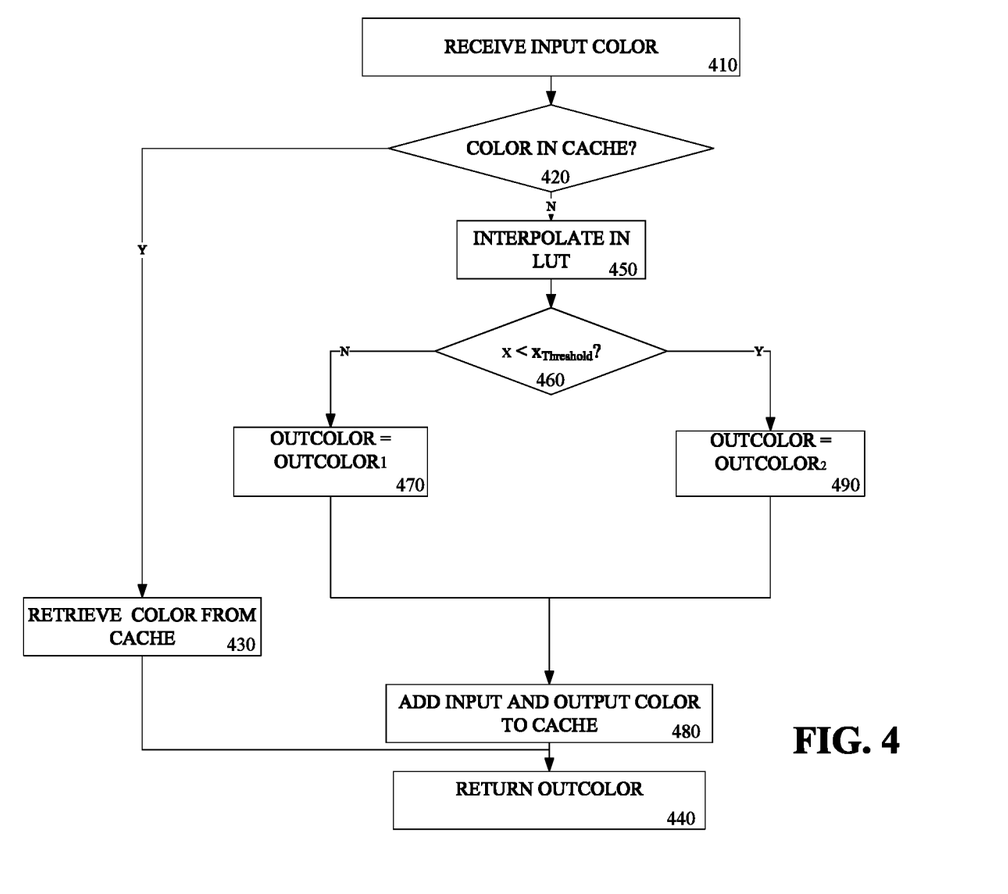
FIG. 4 is a flow diagram illustrating one embodiment of a process for performing a Force-X transformation.

FIG. 4 is a flow diagram illustrating one embodiment for performing a Force-X process. At processing block 410, an input color (InColor) is received at color management unit 210. At decision block 420, a determination is made as to whether InColor is in color cache 310. If so, an output color corresponding to InColor is retrieved from color cache 310, processing block 430. At processing block 440, the output color is returned.

If at decision block 420, a determination is made that InColor is not in cache 310, an interpolation is performed at LUT 320 in the manner discussed above, processing block 450. In a further embodiment, LUT 320 performs a full n-to-9 dimensional interpolation to compute a first output color (OutColor1), a second output color (OutColor2), and the forcing parameter x, where the output space is CMYK.

At decision block 460, a determination is made as to whether $x<x_{Threshold}$. In one embodiment, forcing parameter x is selected by color management unit 210, and can be any parameter consistent with the LUT generation. If $x \geq x_{Threshold}$, the output color (OutColor) is set to OutColor1, processing block 470. In embodiments, forcing parameter x and pre-defined color parameter X may be received from a user (or operator) via a user interface (e.g., a graphical user interface (GUI). In other embodiments, $x_{Threshold}$ may be selected by color management unit 210 or by an operator via the GUI At processing block 480, InColor and OutColor are stored in cache 310. According to one embodiment, cache 310 may need to be reset if $x_{Threshold}$ changes. In such an embodiment, cache 310 is cleared and new colors are cached based on an updated $x_{Threshold}$ during Force-X processing. However, in other embodiments, InColor, x, OutColor1, and OutColor2 may all be cached if $x_{Threshold}$ dynamically (or often) changes. At processing block 440, the output color is returned.

If at decision block 460, a determination is made that $x<x_{Threshold}$, OutColor is set to OutColor2, processing block 490. Subsequently, InColor and OutColor are stored in cache 310 (processing block 480), and OutColor is returned (processing block 440).

Figure 5:
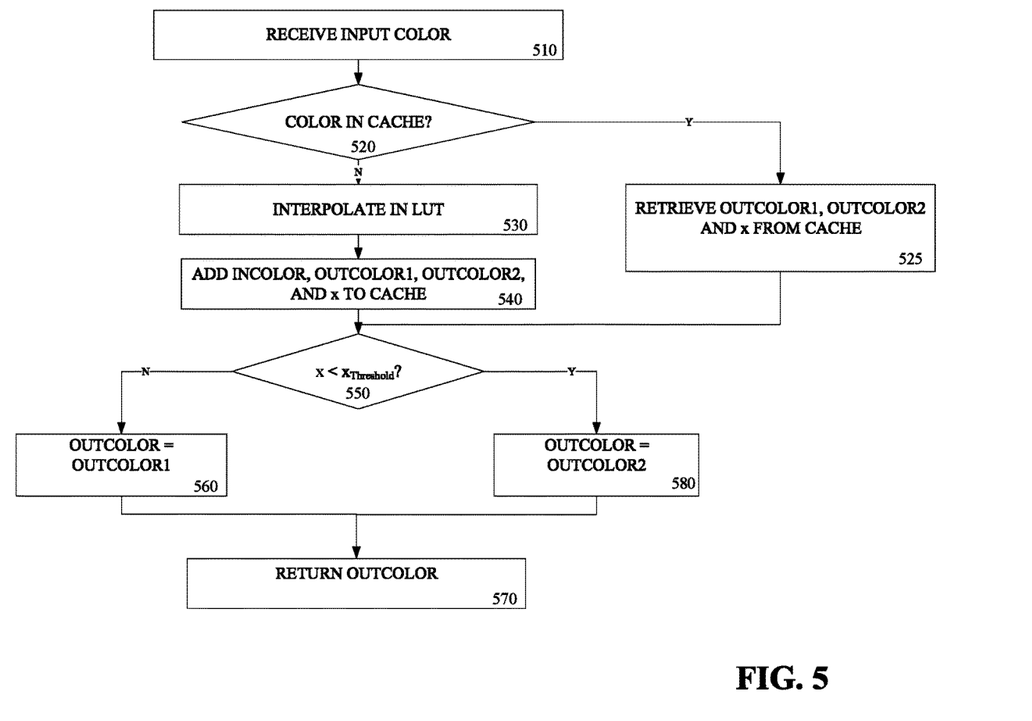
FIG. 5 is a flow diagram illustrating another embodiment of a process for performing a Force-X transformation.

As discussed above, it may be advantageous for cache 310 to store InColor, x, OutColor1, and OutColor2 in embodiments in which $x_{Threshold}$ changes dynamically and/or often. FIG. 5 is a flow diagram illustrating one embodiment for performing a Force-X process in embodiments in which $x_{Threshold}$ dynamically changes.

At processing block 510, InColor is received at color management unit 210. At decision block 520, a determination is made as to whether InColor is in color cache 310. If not, interpolation is performed at LUT 320 to compute OutColor1, OutColor2 and the parameter x, processing block 530. At processing block 540, InColor, OutColor1, OutColor2 and x are stored in cache 310.

At decision block 550, a determination is made as to whether $x<x_{Threshold}$. If $x \geq x_{Threshold}$, OutColor is set to OutColor1, processing block 560. At processing block 570, OutColor is returned. If at decision block 550, a determination is made that $x<x_{Threshold}$, OutColor is set to OutColor2, processing block 580. Subsequently, OutColor is returned at processing block 570.

If at decision block 520, a determination is made that InColor is in color cache 310, OutColor1, OutColor2 and x are retrieved from color cache 310, processing block 525.

Subsequently, control is forwarded to decision block 550 where a determination is made as to whether $x<x_{Threshold}$. Subsequently, OutColor is set to either OutColor1 or OutColor2, as discussed above, and returned.

In an alternative embodiment, multiple LUTs can be employed to perform the Force-X process. In such an embodiment, a first LUT ($LUT_x$) is implemented to perform a first interpolation to map InColor to x. In this embodiment, the first interpolation includes an offset to the base-node and stored node weights. Subsequently, x is compared to $x_{threshold}$. In a further embodiment, a second interpolation occurs at a second LUT ($LUT_1$) upon a determination that $x \geq x_{Threshold}$. As a result, the output color (OutColor) is set to OutColor1. However the second interpolation occurs at a third LUT ($LUT_2$) upon a determination that $x<x_{Threshold}$, which results in the output color (OutColor) being set to OutColor2.

In this embodiment, the same amount of memory is used for the three LUTs and two interpolations. Thus, this embodiment requires negligible additional computation in cases in which node spacing is the same and the offset to the base-node and the node weights are stored. Moreover, this embodiment offers the benefit of different Force-X LUTs without having a duplicate of the common InColor to OutColor1 LUT. Thus, for a given color space, $LUT_1$ maps InColor to OutColor1 as a "default" LUT and additional Force-X LUTs may be added by simply creating pairs of $LUT_X$ (InColor to X) and $LUT_2$ (InColor to OutColor2). An example might be an RGB to CMYK where Force-K and Preserve-K can be trivially implemented.

The above-described transformation provides fast and efficient color computations such that only one cache check, one interpolation and one scalar comparison is required. The process tasks the LUT with performing Force-X transformations. Thus for most efficient performance, each of the OutColor1, x, and OutColor2 components of LUT 320 should be smooth. Further, x should be scalar and relatively simple to compute. However other embodiments may feature x with multiple components. Additionally, the number of LUT nodes should be kept small. Finally, some embodiments may feature multiple x's forced in the same LUT. However, care should be taken to ensure that the forced regions do not overlap and a hierarchy may need to be set.

Figure 6A:
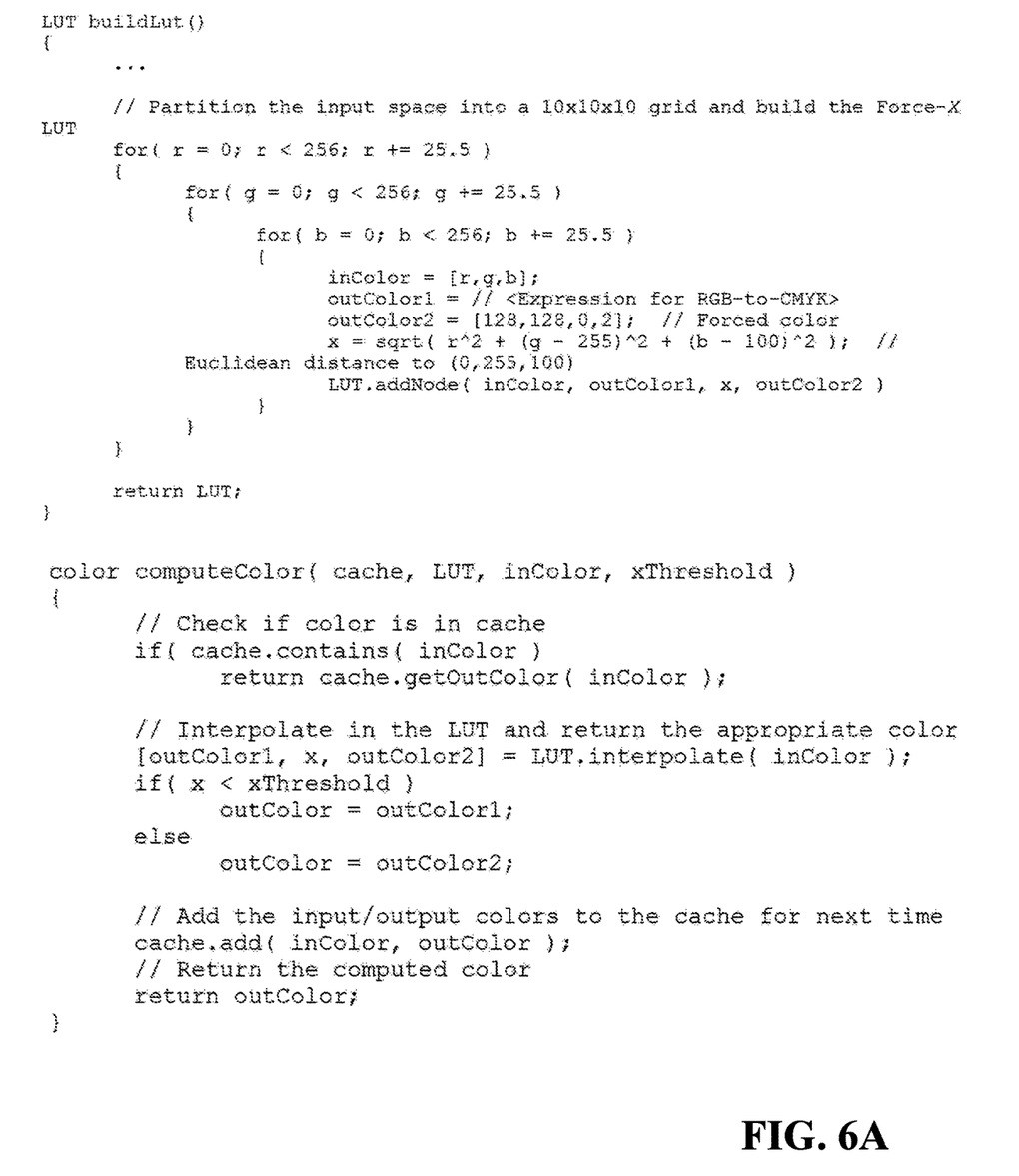
FIGS. 6A-6C illustrate embodiments of code implemented to perform Force-X transformations.
Figure 6B:
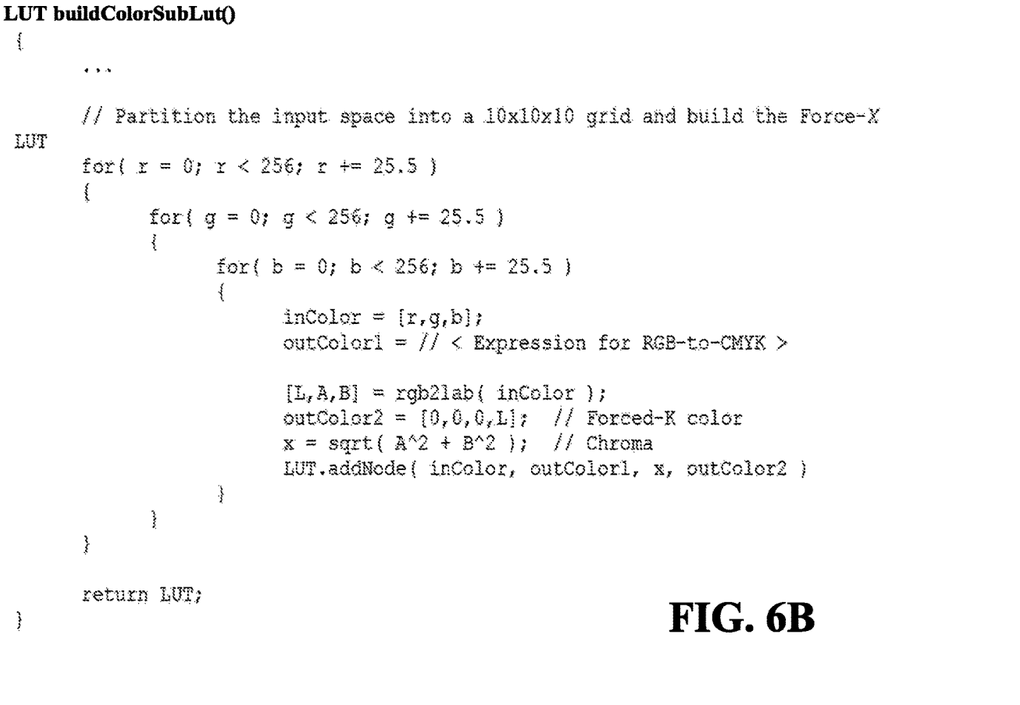
Figure 6C:
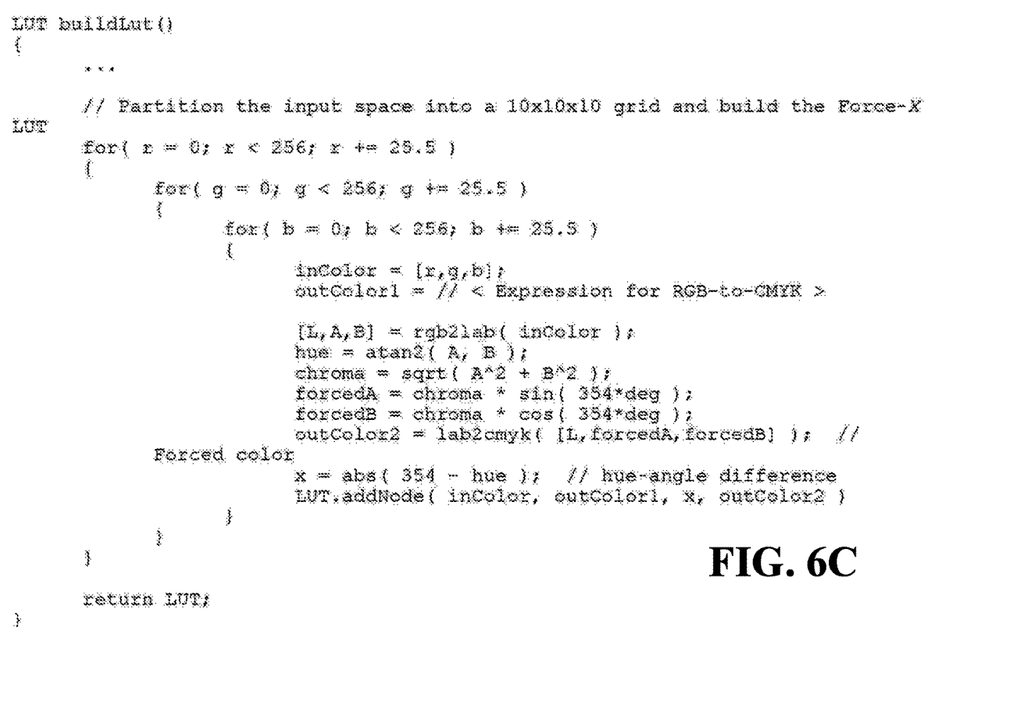

FIGS. 6A-6C illustrate other embodiments of code implemented to perform Force-X transformations. FIG. 6A illustrates one embodiment of code implemented to implement Force-X to force an RGB color (0,255,100) to a CMYK color (128,128,0,2) and is illustrative of a typical color substation that may be desired. As shown in FIG. 6A, code is included for LUT buildup, LUT interpolation and color conversion.

FIG. 6B illustrates one embodiment of code to perform LUT buildup for a Force-X implementation to perform a traditional Force-K for RGB to CMYK, while FIG. 6C illustrates one embodiment of code to perform LUT buildup for a Force-X implementation to force a red hue angle of 354° for RGB to CMYK. The code for LUT interpolation and color conversion in both embodiments are the same as shown in the FIG. 6A embodiment.

Figure 7:
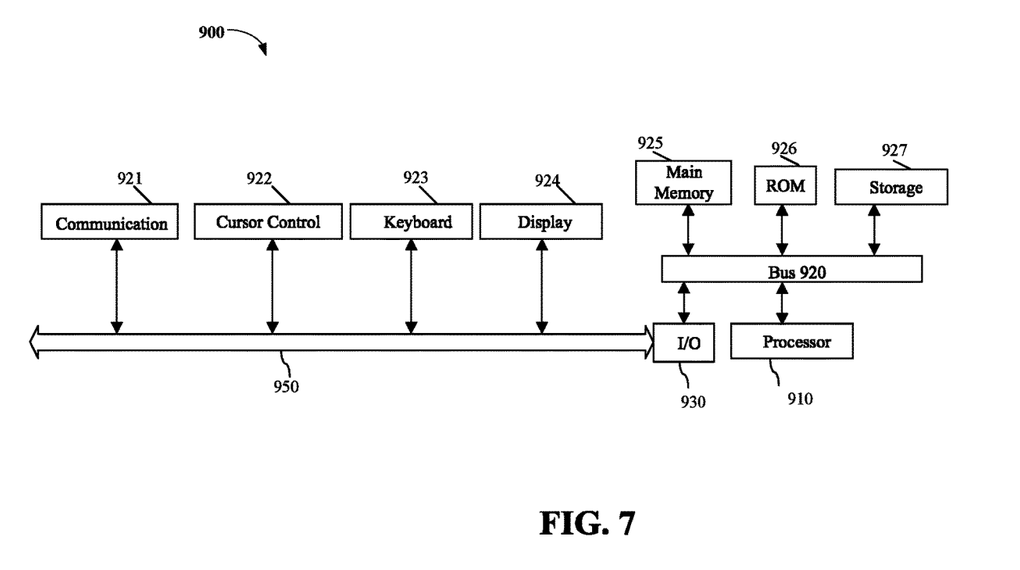
FIG. 7 illustrates one embodiment of a computer system.

FIG. 7 illustrates a computer system 900 on which printing system 130 and/or print controller 140 may be implemented. Computer system 900 includes a system bus 920 for communicating information, and a processor 910 coupled to bus 920 for processing information.

Computer system 900 further comprises a random access memory (RAM) or other dynamic storage device 925 (referred to herein as main memory), coupled to bus 920 for storing information and instructions to be executed by processor 910. Main memory 925 also may be used for storing temporary variables or other intermediate information during execution of instructions by processor 910. Computer system 900 also may include a read only memory (ROM) and or other static storage device 926 coupled to bus 920 for storing static information and instructions used by processor 910.

A data storage device 927 such as a magnetic disk or optical disc and its corresponding drive may also be coupled to computer system 900 for storing information and instructions. Computer system 900 can also be coupled to a second I/O bus 950 via an I/O interface 930. A plurality of I/O devices may be coupled to I/O bus 950, including a display device 924, an input device (e.g., an alphanumeric input device 923 and or a cursor control device 922). The communication device 921 is for accessing other computers (servers or clients). The communication device 921 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A printing system comprising:
   a memory to store:
      a color engine (CE);
      an interpreter; and
      a color cache to store input colors and corresponding output colors; and
   a processor to receive an image having input colors, select a pre-defined color parameter and a forcing threshold, execute the color engine to perform Force-X transformations to map an input color into an output color indicated by the pre-defined color parameter and the forcing threshold, and execute the interpreter to render the image into a bitmap image including the output color, wherein the pre-defined color parameter is selected from a plurality of color parameters.

2. The printing system of claim 1, wherein the processor executes the color engine to map the received input color to a first output color, a second output color and a forcing parameter corresponding to the pre-defined color parameter.

3. The printing system of claim 2, wherein the forcing parameter is compared to the forcing threshold to determine whether the first output color or the second output color is generated as the output color.

4. The printing system of claim 3, wherein the first output color is generated as the output color upon a determination that the forcing parameter is less than the forcing threshold.

5. The printing system of claim 4, wherein the second output color is generated as the output color upon a determination that the forcing parameter is greater than the forcing threshold.

6. The printing system of claim 2, wherein the color cache stores the first output color, the second output color and the forcing parameter.

7. The printing system of claim 1, wherein the pre-defined color parameter comprises a Force-K parameter in which the input color is mapped into a pure black color.

8. The printing system of claim 1, wherein the pre-defined color parameter comprises at least one of: a Force-Primary parameter, a Force-Secondary parameter, a Force-Hue-Angle parameter, a Force-Rich-Black parameter, a Force-Lightness parameter and a Force-Chroma parameter.

9. The printing system of claim 1, further comprising:
wherein the processor executes the CE to map the received input color to the output color wherein the forcing parameter is compared to a forcing threshold to determine whether a first output color or a second output color is generated as an output color, map to the first output color as the output color upon a determination that the forcing parameter is less than the forcing threshold and map to the second output color as the output color upon a determination that the forcing parameter is greater than or equal to the forcing threshold.

10. The printing system of claim 1, further comprising a printer to print the bitmap image, wherein the processor transmits the bitmap image to the printer.

11. A non-transitory machine-readable medium including data that, when accessed by a processor, causes the processor to:
receive an image having input colors;
select a pre-defined color parameter from a plurality of color parameters and a forcing threshold;
perform a Force-X transformation to map an input color into an output color indicated by the pre-defined color parameter and the forcing threshold; and
render the image into a bitmap image including the output color.

12. The machine-readable medium of claim 11, wherein performing the Force-X transformation comprises:

generating a first output color based on the received input color;
generating a second output color based on the received input color; and
generating a forcing parameter corresponding to the pre-defined color parameter based on the received input color.

13. The machine-readable medium of claim 12, including data that, when accessed by the processor, further causes the processor to compare the forcing parameter to the forcing threshold to determine whether the first output color or the second output color is generated as the output color.

14. The machine-readable medium of claim 13, including data that, when accessed by the processor, further causes the processor to generate the first output color as the output color upon a determination that the forcing parameter is less than the forcing threshold.

15. The machine-readable medium of claim 14, including data that, when accessed by the processor, further causes the processor to generate the second output color as the output color upon a determination that the forcing parameter is greater than to the forcing threshold.

16. The machine-readable medium of claim 14, including data that, when accessed by the processor, further causes the processor to store the input color, the first output, the second output color and the forcing parameter in a color cache.

17. The machine-readable medium of claim 16, including data that, when accessed by the processor, further causes the processor to:
receive a second input color;
determine whether the second input color is stored in the color cache; and
retrieving a third output color, a fourth output color and a second forcing parameter from the color cache upon a determination that the second input color is stored in the color cache.

18. The machine-readable medium of claim 17, including data that, when accessed by the processor, further causes the processor to compare the second forcing parameter to the forcing threshold to determine whether the third output color or the fourth output color is generated as the output color.

19. The machine-readable medium of claim 18, including data that, when accessed by the processor, further causes the processor to generate the third output color, the fourth output color and the second forcing parameter upon a determination that the second input color is not stored in the color cache.

20. The machine-readable medium of claim 11, including data that, when accessed by the processor, further causes the processor to:
determine whether the input color is stored in a color cache; and
retrieving a first output color, a second output color and the forcing parameter from the color cache upon a determination that the input color is stored in the color cache.

* * * * *